Figure 2:
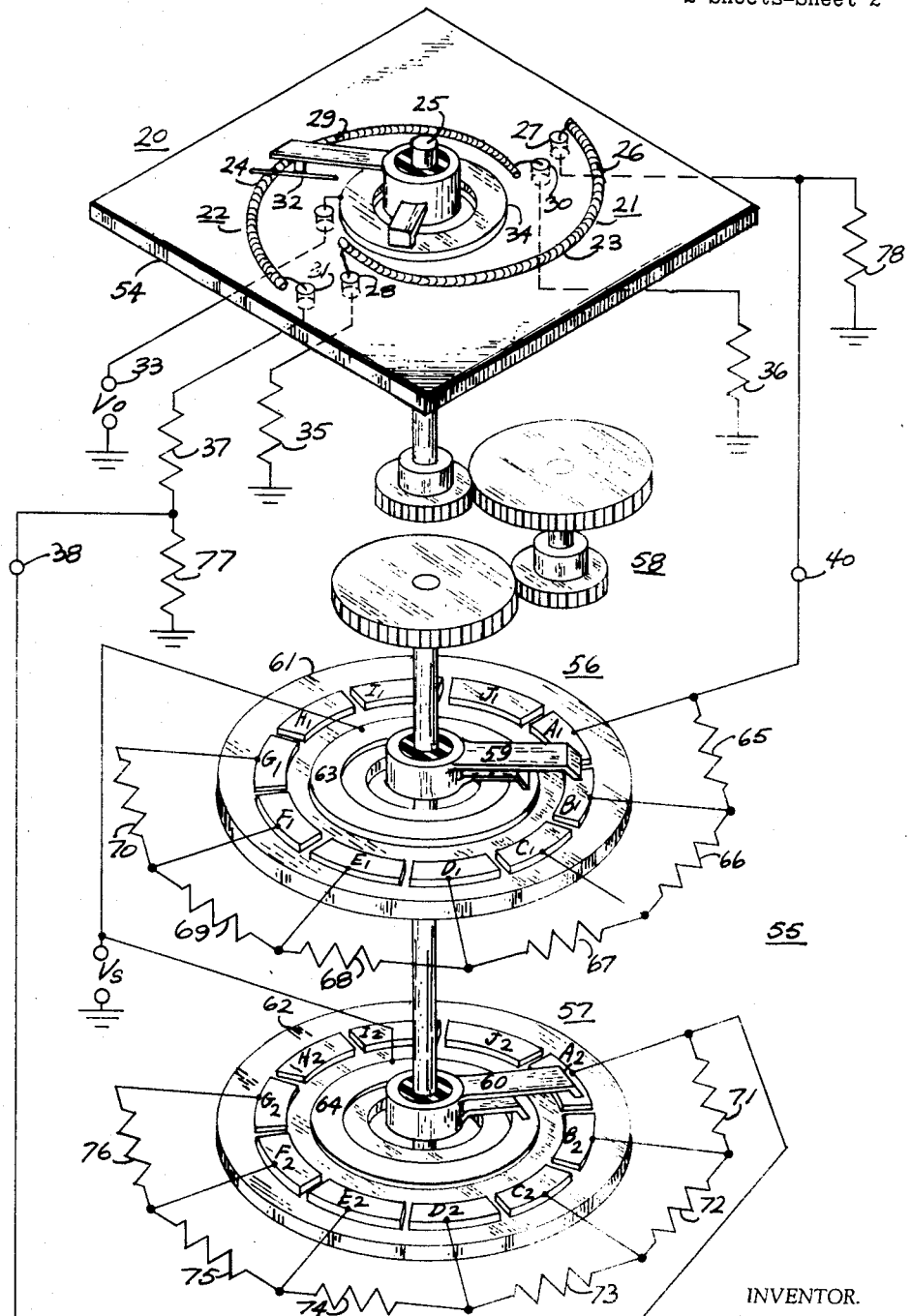

May 24, 1960        A. MAYER        2,938,184
EXPONENTIAL POTENTIOMETER
Filed Nov. 26, 1957        2 Sheets-Sheet 1
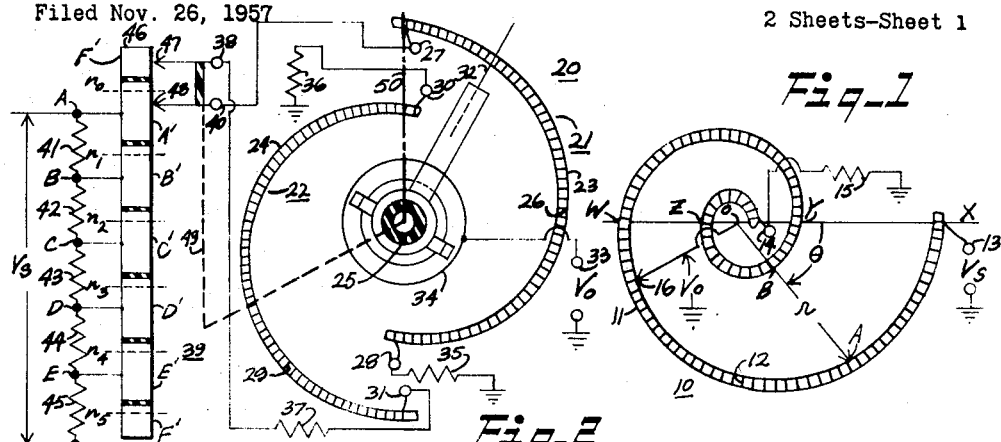
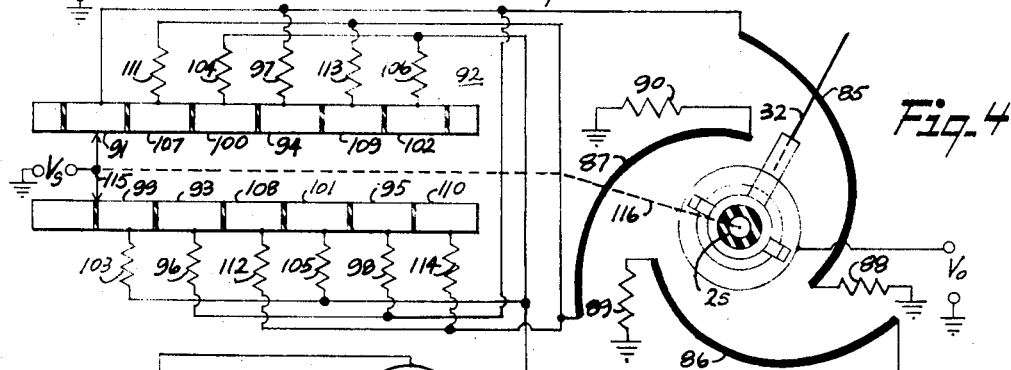
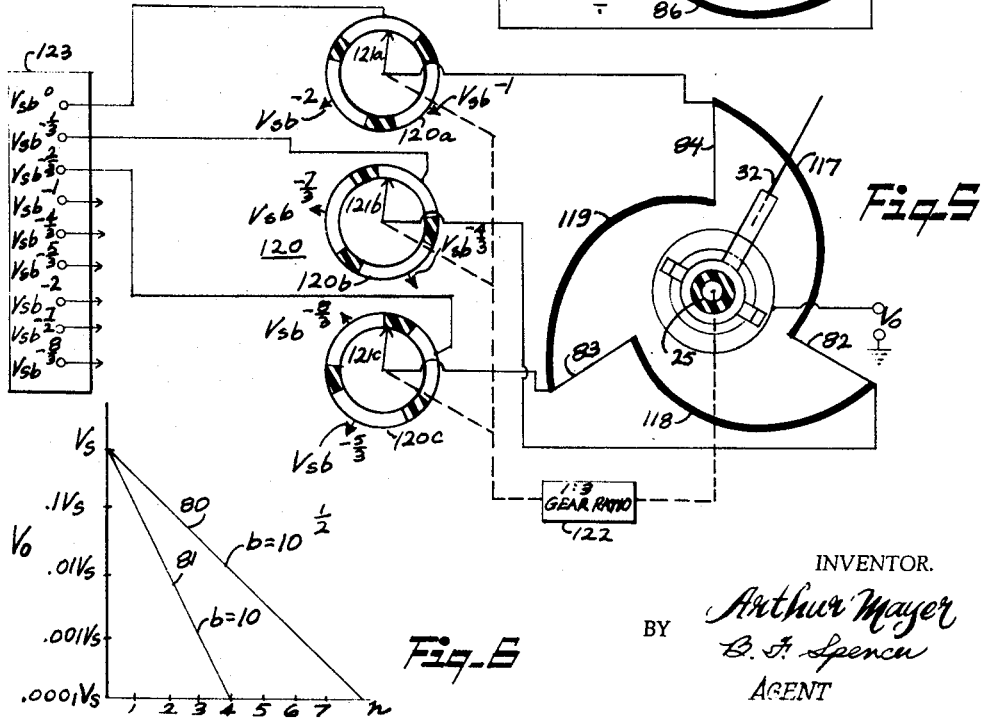
INVENTOR.
Arthur Mayer
BY B. F. Spencer
AGENT May 24, 1960

A. MAYER 2,938,184

EXPONENTIAL POTENTIOMETER

Filed Nov. 26, 1957

2 Sheets-Sheet 2

INVENTOR.
Arthur Mayer
C. F. Spencer
BY
AGENT

United States Patent Office 2,938,184
Patented May 24, 1960

2,938,184
EXPONENTIAL POTENTIOMETER
Arthur Mayer, Kew Gardens, N.Y., assignor to Reeves Instrument Corporation, Garden City, N.Y., a corporation of New York Filed Nov. 26, 1957, Ser. No. 699,012
20 Claims. (Cl. 338—89)

This invention relates to functional impedance devices and in particular to an extended range exponental potentiometer.

Conventional exponential potentiometers are often constructed by winding resistance wire on a uniform mandrel and varying the spacing, diameter or resistivity of the wire along the length of the mandrel to provide an exponential change in resistance. They may also be produced by tapping the winding at appropriate points and connecting resistors either to ground or in shunt across portions of the winding. Another method which provides close conformity to the desired function involves placing the resistance wire on a card of continuously changing width thereby varying the length of the individual turns of wire.

All of these methods have the common disadvantage that the potentiometer range obtainable with a given voltage resolution is restricted by the physical dimensions of the mandrel and the diameter of the wire. Since the maximum number of turns and the minimum size of wire that can be placed on the given mandrel is necessarily limited, the voltage between each turn of the potentiometer winding becomes larger as the output voltage range increases. Thus, the accuracy with which a conventional wire-wound exponential potentiometer can be set decreases as the output voltage range is increased.

In the present invention a highly accurate exponential potentiometer is provided which without degradation of voltage or angular resolution, furnishes an output voltage covering many decades. The potentiometer includes one or more impedance elements, each consisting of a longitudinally extensive mandrel of uniform cross-section, uniformly wound with constant resistivity wire, and shaped in the form of a segment of a logarithmic spiral. Alternately, the impedance elements may comprise a thin layer of conductive plastic or other resistive material affixed to an insulated mandrel. The spiral impedance elements are symmetrically disposed about a common origin which also serves as an axis for a rotatable contact or wiper arm. The wiper arm conductively engages the surface of each of the impedance elements in turn, being connected through a slip-ring to an output terminal of the device. The impedance elements are arranged in overlapping relationship with one another so that the end portions of adjacent elements, although they have the same angular position, are at different distances from the origin. The wiper arm, which has a length exceeding the radial distance between adjacent end portions of the impedance elements, is continually in contact with at least one impedance element. A voltage selector switch is operated in synchronism with the wiper arm to couple voltages of the required magnitudes across each of the impedance elements in accordance with the angular position of the wiper arm.

It is an object of this invention to provide an improved exponential potentiometer.

Another object is to provide an exponential potentiometer having an output voltage which extends over an extremely wide range of voltages without increase in the physical size of the unit.

Still another object is to provide an extended range exponential potentiometer having improved voltage and angular resolution over its entire range.

A further object is to provide an extended range exponential potentiometer which produces a continuous output voltage over its entire range.

Other objects and advantages will become apparent from the following description, the appended claims, and the drawings of which:

Fig. 1 is an elementary form of the invention showing its principles of operation, Fig. 2 depicts schematically one embodiment of the invention using a pair of spiral impedances as interpolating elements, Fig. 3 shows a perspective view of another version of the embodiment of Fig. 2 in mechanically simplified form, Fig. 4 illustrates diagrammatically an embodiment of the invention using three spiral impedances as interpolating elements, Fig. 5 shows still another embodiment of the invention in which the spiral impedances have been connected in series and, Fig. 6 is a semi-logarithmic plot of the input-output characteristics of the apparatus of Figs. 1–5.

In Fig. 1 there is shown a resistance element 10 including a mandrel 11 of uniform cross-section curved in the form of a segment of a logarithmic spiral. A length of resistance wire 12 having suitable resistivity is wound uniformly on the mandrel. The end terminal 13 of resistance wire 12 is connected to a source of voltage $V_s$, while terminal 14 is connected through a resistor 15 to ground.

The shape of the resistance element 10 may be expressed by the equation for a logarithmic spiral:

$$r = e^{a\theta} \tag{1}$$

where $r$ is the straight-line distance from the origin 0 of the spiral to any given point on the spiral, $\theta$ is the angular displacement in radians measured from a reference line OX to a line connecting the origin and the given point, $e$ is the base of naperian logarithms and $a$ is a constant. The reference line OX is taken through the end of resistance element 10 conected to terminal 13, it being assumed that this end is at unity distance from the origin. All clockwise angles measured from this line are considered to be negative.

It will be more convenient to measure the angular displacement in revolutions, rather than in radians. If $n$ is the number of clockwise revolutions of the radius vector from the reference line OX, then $\theta = -2\pi n$, where $n$ may have any integral or non-integral value. Equation 1 for the logarithmic spiral now becomes:

$$r = e^{a\theta} = e^{-2\pi a n} = b^{-n} \tag{2}$$

where $b = e^{2\pi a}$

As seen from inspection of Equation 2, the logarithmic spiral has a radius of unity when $n$ equals zero. As the magnitude of $n$ is increased the curve repeatedly circles the origin, its radius continually decreasing and approaching zero. The length of the logarithmic spiral between $n$ equals zero and $n$ equals infinity has a finite value $L_t$, while the length L of the spiral from $n$ to infinity is:

$$L = L_t b^{-n} \tag{3}$$

Although it is not physically possible to wrap a resistance element having a length $L_t$, and a corresponding resistance $R_t$, around the origin in the form of a logarithmic spiral, the same total resistance is obtained by using the spiral resistance element 10 over the useful angular range of the potentiometer and adjusting resistor 15 to represent the balance of the total resistance $R_t$. The resistance $R$ between any point on the spiral element 10 located $n$ revolutions from reference line OX and the grounded end of resistor 15 is:

$$R = R_t b^{-n} \qquad (4)$$

and the voltage $V_0$ between this point and ground is:

$$V_0 = \frac{R}{R_t} V_s = V_s b^{-n} \qquad (5)$$

A contact or wiper arm, shown schematically by arrow 16, is arranged to move along resistance element 10 as the wiper arm is rotated about an axis through the origin. The wiper may, for example, consist of a grooved conducting contact arranged to ride on resistance element 10 and simultaneously move in a radial direction on a support having its axis at the origin. The output voltage $V_0$ between the wiper and ground at each position of the wiper arm is equal to the voltage on the resistance wire 12 at that point and is, therefore, exponentially related to the angular position of the wiper arm.

The constant $b$ completely determines the shape of the spiral. Since $b$ also determines the relationship between the output voltage and the rotation of the wiper arm, there is a unique correspondence between the physical form of the mandrel and the exponential output voltage which will be obtained from it.

The range of the exponential potentiometer of Fig. 1 is clearly limited by the length of the spiral resistance element which can be placed on a unit of reasonable size. This limitation can be overcome, however, by using two or more segments of the spiral over and over again to represent its entire length and adjusting the voltage across each segment in accordance with the number of revolutions made by the wiper arm. This may be seen by examining the voltages at points A and B on resistance element 10. The voltage at point A from Equation 5 is:

$$V_A = V_s b^{-n} \qquad (6)$$

while the voltage at point B is:

$$V_B = V_s b^{-(n+1)} = (V_s b^{-1}) b^{-n} \qquad (7)$$

Therefore, if a voltage equal to $V_s b^{-1}$ were connected to terminal 13 instead of $V_s$, the wiper in following resistance element 10 from the end connected to terminal 13 to point W would produce exactly the same output voltage as if it were moved from point Y to point Z with a voltage $V_s$ connected to terminal 13. Similarly, if the voltage coupled to terminal 13 were multiplied by $b^{-1}$ for each revolution of the wiper arm, the same segment of the spiral resistance element could be used to produce each succeeding cycle of output voltage.

Fig. 2 depicts schematically a form of the invention in which the single multiturn spiral resistance element 10 of Fig. 1 has been replaced by an interpolating unit 20 having a pair of overlapping spiral resistance elements 21 and 22. Each of the resistance elements 21, 22 includes, respectively, a longitudinally extensive insulated mandrel 23, 24 of uniform cross-section curved to form a segment of a logarithmic spiral having its origin on the axis of an input shaft 25. Resistance wire 26 is wound uniformly along the length of mandrel 23 and connected to terminals 27 and 28 at each end while resistance wire 29, connected to terminals 30 and 31, is wound uniformly on mandrel 24. While resistance elements 21 and 22 each have a uniform resistance per unit length, their total resistances may be different from each other. Resistance elements 21 and 22 are symmetrically disposed about the axis of shaft 25, being coplanar and displaced 180° from each other. The arcuate length of each of the resistance elements 21, 22 subtends an angle of slightly over 180° so that adjacent ends of the resistance elements overlap.

A radial wiper arm 32, affixed to input shaft 25 and insulated therefrom, conductively engages the resistance wire wound on mandrels 23 and 24 by sliding along the surface of the wire as it is rotated by shaft 25. Since resistance elements 21 and 22 overlap at the ends, wiper arm 32 will continuously be in contact with at least one of the resistance elements. The voltage impressed on wiper arm 32 is coupled to output terminal 33 through slip-ring 34.

Resistors 35, 36 are coupled, respectively, between terminals 28, 30 and ground, while resistor 37 is connected between terminal 31 and terminal 38 of a voltage selector 39. Terminal 27 of resistance element 21 is coupled directly to terminal 40 of selector 39.

The ohmic value of resistor 35 is selected so that the output voltage $V_0$ equals $V_s b^{-\frac{1}{2}}$ when wiper arm 32 is set at exactly 180° (½ revolution from a reference line 50 through the end turn of resistance wire 26). It is adjusted with resistance element 22 disconnected from the circuit and a voltage $V_s$ applied to terminal 40. Similarly, with resistance element 21 disconnected and a voltage $V_s$ applied to terminal 38, resistors 36 and 37 are selected so that with wiper arm 32 at 180° the output voltage equals $V_s b^{-\frac{1}{2}}$ and with arm 32 turned through one complete revolution the output voltage is $V_s b^{-1}$.

Voltage selector 39 includes a low impedance voltage divider comprising series-connected resistors 41 to 45 having a voltage source $V_s$ coupled between one end of resistor 41 and the grounded end of resistor 45. The values of resistors 41 to 45 are selected so that the voltages at junctions A to E are exponentially related; that is they equal $V_s b^0$, $V_s b^{-1}$, $V_s b^{-2}$, $V_s b^{-3}$, and $V_s b^{-4}$ respectively. Resistors 41 to 45 are sufficient in number to provide a potentiometer having an output voltage which changes continuously in an exponential manner when input shaft 25 is rotated through five revolutions. If a greater range is required, additional resistors may be added to the voltage divider.

A segmented commutator 46, consisting of insulated conductive segments A' to E' coupled to junctions A to E respectively and a sixth segment F' having no electrical connection, is shown in developed form. A pair of brush contacts 47 and 48 spaced a fixed distance apart are connected mechanically by coupling 49 to input shaft 25 and arranged to slide along commutator 46 as the input shaft is rotated.

Wiper arm 32 is illustrated during its first revolution measured clockwise from dot-dashed reference line 50. Reference line $n_0$, drawn through segment A' of commutator 46 indicates the approximate position of contact 48 when wiper arm 32 is set at zero revolutions, and dashed lines $n_1$ to $n_5$ indicate the position of contact 48 at the end of the first to fifth clockwise revolutions of the wiper arm respectively. The distance between contacts 47 and 48 is approximately equal to one half the length of one of the conductive segments of commutator 46.

With wiper arm 32 in the position shown, the voltage applied to terminal 27 of resistance element 21 through contact 48 and segment A' is equal to $V_s$. The output voltage appearing between terminal 33 and ground through wiper 32 and slip-ring 34 is $V_s b^{-n}$, where $n$ is the fractional part of a revolution through which wiper 32 has been displaced. As the wiper is rotated clockwise by input shaft 25, spaced contacts 47 and 48 are displaced a corresponding distance downward by the mechanical coupling 49.

When wiper 32 has been turned through one-half revolution, both contacts 47 and 48 are engaging segment A'. The voltage applied to terminals 38 and 40 of voltage selector 39 is then equal to $V_s$ and, by virtue of the selected values of resistors 35—37, the output voltage $V_0 = V_s b^{-\frac{1}{2}}$. At this setting of wiper 32, and every other integral multiple of one-half revolution, the wiper is in contact with both resistance elements 21 and 22 and, therefore, there is a continuous smooth change in output voltage as arm 32 moves from one resistance element to the other.

During the second half of the first revolution while wiper 32 is in contact with resistance element 22 and the wiper continues to move clockwise, contact 48 will leave segment A' and engage segment B' applying a voltage $V_s b^{-1}$ to terminal 40. The voltage on terminal 38 remains at $V_s$ during this entire half cycle. At the end of exactly one revolution, therefore, the voltage impressed on wiper 32 both resistance elements 21 and 22 is $V_s b^{-1}$.

During the next revolution, contact 47 will engage segment B' thereby applying a voltage $V_s b^{-1}$ to terminal 38. The output voltage during the entire second revolution will, therefore, be $(V_s b^{-1}) b^{-n}$ which corresponds to the desired voltage of Equation 7.

As input shaft 25 is turned through each additional revolution the voltages applied to terminals 38 and 40 will decrease exponentially as contacts 47 and 48 engage each succeeding segment of commutator 46. Switching of the voltage on terminal 38 occurs when wiper 32 is contacting resistance element 21 and switching of the voltage on terminal 40 occurs when the wiper is contacting resistance element 22. After five revolutions of the input shaft contact 48 will be situated at $n_5$ on electrically isolated segment F' while contact 47 will be engaging segment E' having a potential $V_s b^{-4}$. The output voltage drops to zero after five revolutions of wiper 32, since segment F' is not energized, marking the end of the potentiometer range. A limit stop can also be provided if desired, to prevent movement of contacts 47 and 48 past their end positions.

It should be noted that neither the length of the segments of commutator 46 nor the spacing of contacts 47 and 48 is critical. It is only necessary that the correct voltage be applied to each resistance element in synchronism with the rotation of wiper 32.

Fig. 3 is a perspective view of interpolating unit 20 in mechanically simplified form together with another form of voltage selector 55 consisting of selector switches 56 and 57. Resistance elements 21 and 22 are shown partially embedded in spiral grooves cut in non-conducting supporting member 54. Input shaft 25 is coupled by gear train 58 to rotating selector switch arms 59 and 60 of selector switches 56 and 57 respectively. A plurality of conducting segments $A_1$ to $J_1$ are symmetrically disposed upon the surface of non-conducting disc 61 while an identical set of segments $A_2$ to $J_2$ are similarly disposed upon the surface of non-conducting disc 62. Voltage source $V_s$ is connected sequentially to segments $A_1$ to $J_1$ through slip-ring 63 located on disc 61 and to segments $A_2$ to $J_2$ through slip-ring 64 on disc 62. The angular positions of corresponding segments $A_1$ and $A_2$, $B_1$ and $B_2, \ldots J_1$ and $J_2$, are identical but selector switch arm 59 is displaced clockwise from switch arm 60 a distance approximately equal to one-half of a segment.

Series resistors 65 to 70 are connected across segments $A_1$ and $G_1$ and their junctions coupled to segments $B_1$ to $F_1$ respectively; while series resistors 71 to 76 are connected across segments $A_2$ and $G_2$ and their junctions coupled respectively to segments $B_2$ to $F_2$. Segment $A_1$ is coupled to terminal 40 while segment $A_2$ is connected to terminal 38. The range of the potentiometer may be extended, as in the embodiment of Fig. 2, merely by adding additional series resistors and connecting them to the unused segments.

In Fig. 3, wiper arm 32 is illustrated as having been turned by input shaft 25 through about three-quarters of a revolution. Selector switch arm 59 is shown passing from segment $A_1$ to segment $B_1$ while selector switch arm 60 makes contact with segment $A_2$. The ratio of gear train 58 has been selected so that it will move switch arms 59 and 60 from a point on one segment to the corresponding point on the next segment while wiper arm 32 makes one complete revolution.

Thus, during the first half of the first revolution of wiper 32, selector switch arm 59 contacts only segment $A_1$, during the second half of the first revolution it switches from segment $A_1$ to $B_1$, during the first half of the second revolution it contacts only segment $B_1$, and so forth, this sequence being carried on as input shaft 25 is rotated clockwise. Similarly, selector switch arm 60 is moving between segments $J_2$ and $A_2$ during the first half revolution, contacts only segment $A_2$ during the second half revolution, and so forth, this sequence being carried on in synchronism with rotation of wiper arm 32 and selector switch arm 59.

Resistors 65 through 76 are selected to produce voltages at terminals 38 and 40 equal to $V_s$ during the first revolution of shaft 25 wiper 32, $V_s b^{-1}$ during the second revolution, $V_s b^{-2}$ during the third revolution, the terminal voltages decreasing exponentially until after the seventh revolution when they drop from $V_s b^{-6}$ to zero as a result of selector switch arms 59 and 60 contacting segments $H_1$ and $H_2$ respectively. Trimming resistors 77 and 78, connected respectively to terminals 38 and 40, are adjusted to provide predetermined resistances between terminals 38, 40 and ground so that the values of resistors 65 to 76 may be specified without provisions for their trimming.

In a typical application of this exponential potentiometer it may be desired to produce an output voltage which in two revolutions of the input shaft changes exponentially by one decade; that is, $b$ equals $10^{1/2}$ and the output voltage $V_0$ from Equation 5 is $V_s(10^{1/2})^{-n}$. With gear train 58 having a ratio of 10:1, and trimming resistors 77 and 78 adjusted to produce resistances of 17,782.8 ohms and 10,000 ohms respectively between terminals 38, 40 and ground, the values of resistors 65 to 76 are as follows:

| Resistor | Ohmic Value | Resistor | Ohmic Value |
|---|---|---|---|
| 65 | 21,623 | 71 | 38,450 |
| 66 | 68,377 | 72 | 121,600 |
| 67 | 216,230 | 73 | 384,500 |
| 68 | 683,770 | 74 | 1,216,000 |
| 69 | 2,162,300 | 75 | 3,845,000 |
| 70 | 6,837,700 | 76 | 12,160,000 |

In Fig. 6, which is a plot of the logarithm of the output voltage $V_0$ as a function of the number of revolutions of the input shaft $n$, curve 80 represents the output voltage obtained from the potentiometer of Fig. 3 with the resistance values listed.

The exponential change in output voltage for a given number of revolutions of the input shaft may be altered by modifying the value of $b$. If $b$ is made equal to 10 instead of $10^{1/2}$, for example, the output voltage will change one decade for each revolution instead of for every two revolutions as seen by comparison of curves 80 and 81 of Fig. 6. This is done physically by modifying the values of series resistors 65 to 76 to produce the required voltages at terminals 38 and 40 and, in addition, changing the curvature of spiral resistance elements 21 and 22. Decreasing the curvature of the resistance elements will increase the number of revolutions of the input shaft required to produce a given change in output voltage while increasing the curvature will decrease the number of revolutions. A practical limit is reached, however, in increasing the curvature of the two spiral resistance elements 21 and 22 since their minimum radii must be greater than the radius of slip ring 34.

The number of revolutions per decade voltage change may be decreased considerably beyond that physically possible with two spiral resistance elements by the use of a plurality of resistance elements spaced symmetrically about the input shaft. Increasing the number of resistance elements allows each element to have a greater curvature toward the origin together with a shorter length. The resistance elements will not, therefore, approach the origin so closely as to interfere with the slip ring or input shaft.

In Fig. 4 three identical overlapping coplanar resistance elements 85, 86, and 87 are disposed symmetrically about an input shaft 25. The resistance elements, which may be wire-wound or made of a conductive plastic, are each curved to form a segment of a logarithmic spiral having a curvature greater than that of the resistance elements 21, 22 of Figs. 2 and 3. Thus, whereas resistance elements 21, 22 will provide a potentiometer producing a change in output voltage of one decade for every two revolutions of input shaft 25, resistance elements 85—87 may, for example, be curved to produce a change of one decade in the output voltage for each revolution.

Resistance elements 85, 86 and 87 are connected to ground through resistors 88, 89 and 90 respectively. The other end of resistance element 85 is coupled directly to segment 91 of still another form of voltage selector 92 and to segments 93, 94, and 95 by resistors 96, 97, and 98 respectively. Similarly, resistance element 86 is coupled to segments 99—102 by resistors 103—106 respectively and resistance element 87 to segments 107—110 by resistors 111—114 respectively.

Selector switch arm 115, which is energized by voltage source $V_s$, is coupled to input shaft 25 by mechanical coupling 116, moving to the right in the developed view of Fig. 4 as wiper 32 is rotated clockwise. The portion of voltage $V_s$ connected across resistance elements 85 to 87 is determined by the ohmic value of the resistors and the position of switch arm 115 in relation to the segments of selector switch 92. The segments are arranged on selector switch 92 to switch the voltage across each resistance element only when the wiper arm is not contacting that element.

Fig. 5 shows schematically still another embodiment of the invention in which resistance elements 117—119 are connected in series by wires 82—84, having practically zero resistance, while the junction between each pair of elements is connected to one deck of a selector switch 120. One deck is required for each resistance element and each deck is divided into a number of insulated conductive segments, the number of segments in each deck being equal to the total number of revolutions through which the input shaft must be rotated to utilize the total range of the potentiometer. The potentiometer of Fig. 5 has a range of three cycles and, therefore, each deck is divided into three segments. The selector switch arms 121a—121c are ganged together and coupled to input shaft 25 through a 3:1 gear train 122 so that the switch arms will make one complete revolution for every three revolutions of wiper arm 32.

A low impedance voltage source 123 supplies exponentially related voltages to the segments on each deck of selector switch 120. As shown the voltages coupled to deck 120a are $V_s b^0$, $V_s b^{-1}$, and $V_s b^{-2}$, while the voltage coupled to decks 120b and 120c are respectively $V_s b^{-1/3}$, $V_s b^{-4/3}$, $V_s b^{-7/3}$ and $V_s b^{-2/3}$, $V_s b^{-5/3}$ and $V_s b^{-8/3}$. Only one connection is shown between each selector switch deck and voltage source 123 in order to avoid undue crowding of the diagram.

As input shaft 25 is rotated the exponential voltages between adjacent terminals on voltage source 123 are connected across each exponential resistance element 117—119. The output voltage $V_0$, therefore, continuously changes exponentially throughout the entire range of the potentiometer. The segments on each of the three decks 120a–120c are of equal length and located with respect to one another so that the resistance element junction which is not adjacent to the wiper arm is always the one to be switched. Thus, selector switch arm 121c, connected to the junction between resistance elements 118 and 119 is switched from one segment to the next while switch arms 121a and 121b are coupling voltages $V_s$ and $V_s b^{-1/3}$ across resistance element 117. Likewise, when wiper 32 is contacting resistance element 118 switch arm 121a will be passing between conductive segments while switch arms 121b and 121c are coupling voltages $V_s b^{-1/3}$ and $V_s b^{-2/3}$ respectively across resistance element 118. This sequence is continued until input shaft 25 has been rotated through the entire range of the potentiometer. The potentiometer of Fig. 5 assures a smooth and continuous exponential change in voltage as wiper 32 travels between resistance elements since the end of each element must be at the same voltage as the adjacent element to which it is coupled.

One of the significant features of this invention is that it provides an exponential potentiometer which can be of relatively small size yet have excellent resolution over an output voltage range limited only by the sensitivity of the means used to measure the output voltage. Furthermore, the potentiometer provides a continuous true exponential output voltage without discontinuities and without linear or other approximations to the exact exponential curve.

The potentiometer may be used in a variety of applications where an exponential function is required. It may be used, for example, as the follow-up potentiometer in a servo in order to obtain a shaft rotation proportional to the logarithm of a number represented by a voltage. Another use would be to obtain the hyperbolic sine or cosine of a function by gearing two potentiometers to turn in opposite directions, one producing $e^x$ and the other $e^{-x}$.

As many changes could be made in the above construction and many different embodiments of this invention could be made without departing from the scope thereof, it is intended that all matter contained in the above description or shown in the accompanying drawing shall be interpreted as illustrative and not in a limiting sense.

What is claimed is:

1. A functional potentiometer comprising at least one longitudinally extensive impedance element curved about a fixed origin, the distance between any point on said impedance element and said origin being an exponential function of the angular displacement of said point from a predetermined reference line, and wiper means conductively engaging said impedance element, said wiper means being adapted for rotation about said origin.

2. A functional potentiometer comprising at least one longitudinally extensive impedance element curved about an origin in the form of a logarithmic spiral, means for applying a predetermined voltage across said impedance element, and wiper means conductively engaging said impedance element, said wiper means being adapted for rotation about said origin.

3. The functional potentiometer as defined by claim 2 wherein the impedance per unit length of said longitudinally extensive impedance element is constant.

4. A variable impedance device comprising in combination, a base, a longitudinally extensive impedance element having a uniform resistance per unit of length, said longitudinally extensive impedance element being curved about a fixed origin in the form of a logarithmic spiral and supported by said base, wiper means conductively engaging said impedance element, and means supported relative to said base for varying the angular position of said wiper means about said fixed origin.

5. A functional potentiometer comprising at least one impedance unit consisting of a longitudinally extensive impedance element curved about a fixed origin in the form of a segment of a logarithmic spiral and a resistor connected between one end of said impedance element and a common reference point, means for applying a predetermined voltage across said impedance unit, and wiper means conductively engaging said impedance element, said wiper means being adapted for rotation about said fixed axis.

6. A functional potentiometer comprising a plurality of longitudinally extensive curved impedance elements each shaped in the form of a segment of a logarithmic spiral, said curved impedance elements being disposed about an origin common to each of said spirals, wiper means adapted for rotation about said origin in the plane of said curved impedance elements, said wiper means conductively engaging each of said curved impedance elements, and voltage selector means mechanically coupled to said wiper means, said voltage selector means being adapted to receive an applied voltage and selectively couple predetermined portions thereof across said impedance elements, the magnitudes of said predetermined portions of said applied voltage being determined by the angular position of said wiper means.

7. A functional potentiometer as defined in claim 6 wherein said voltage selector means comprises variable impedance means coupled to each of said impedance elements, and switching means coupled to said wiper means for varying the value of said variable impedance means in accordance with the angular displacement of said wiper means.

8. A functional potentiometer comprising input means, a plurality of longitudinally extensive impedance elements having uniform resistance per unit length each curved in the form of a segment of a logarithmic spiral, the origin of each of said segments of said logarithmic spirals being at a common point, wiper means coupled to said input means, said wiper means being arranged to rotate about said common point in response to displacement of said input means and to conductively engage each of said impedance elements, a plurality of resistors having a common junction, each of said resistors being coupled in series with one end of a corresponding impedance element, and means coupled to said input means for sequentially applying voltages having predetermined magnitudes between the other end of each of said impedance elements and said common junction in synchronism with the rotation of said wiper means.

9. A functional potentiometer as defined in claim 8 wherein said plurality of impedance elements are symmetrically disposed about said common point, each of said impedance elements having a length subtending an angle not less than 360° divided by the total number of impedance elements, and said wiper means comprises an arm having a radial length not less than the radial distance between the end of any one of said impedance elements and the adjacent impedance element.

10. A functional potentiometer comprising an input shaft, first and second longitudinally extensive coplanar resistance elements having uniform resistance per unit length, each of said resistance elements being curved in the form of a segment of a logarithmic spiral having its origin on the axis of said input shaft and a length subtending an angle of at least 180°, said first and second resistance elements being arranged with corresponding ends equidistant from the axis of said input shaft and displaced 180° from each other, first and second resistor means having a common junction, said first resistor means being coupled to one end of said first resistor element and said second resistor means being coupled to one end of said second resistance elements, wiper means coupled to said input shaft for rotation therewith, said wiper means conductively engaging said resistance elements, and voltage selector means coupled to said input shaft, said voltage selector means being adapted to receive an applied voltage and selectively coupled predetermined portions thereof to the other ends of said first and second resistance elements, the magnitudes of said predetermined portions of said applied voltage being dependent upon the angular displacement of said input shaft.

11. A functional potentiometer as defined by claim 10 wherein said voltage selector means comprises first and second variable resistor means adapted to receive said applied voltage, said first and second resistor means being coupled to said first and second resistance elements respectively, and switching means adapted for varying the value of said resistor means in accordance with the angular displacement of said input shaft.

12. A functional potentiometer comprising an input shaft; a plurality of symmetrically disposed coplanar impedance elements each including a longitudinally extensive insulated mandrel curved in the form of a segment of a logarithmic spiral having its origin on the axis of said input shaft and a conductor of uniform resistance per unit length wound on the exterior surface of said mandrel; wiper means coupled to said input shaft, said wiper means being arranged to rotate about the axis of said input shaft in response to displacement of said input means and to consecutively engage the resistive conductors of said impedance elements; a plurality of resistors having a common junction, each of said resistors being coupled in series with one end of a corresponding impedance element; and voltage selector means mechanically coupled to said wiper means, said voltage selector means being adapted to receive an applied voltage and selectively couple predetermined portions thereof the other ends of said plurality of impedance elements, the magnitudes of said predetermined portions of said applied voltage being dependent upon the angular displacement of said input shaft.

13. In a functional potentiometer, a plurality of longitudinally extensive impedance elements having a uniform resistance per unit length, each of said impedance elements being curved about a fixed origin in the form of a logarithmic spiral and adapted for the application of a predetermined voltage thereacross, and wiper means arranged to conductively engage said impedance elements, said wiper means being adapted for rotation about said origin.

14. A functional potentiometer comprising an input shaft, three series-connected longitudinally extensive curved impedance elements of constant resistance per unit length each shaped in the form of a segment of a logarithmic spiral, said curved impedance elements being disposed symmetrically about an origin on the axis of said input shaft, wiper means conductively engaging said curved impedance elements in response to rotation of said input shaft, and voltage selector means coupled to said wiper means, said voltage selector means being adapted to receive an applied voltage and to couple predetermined portions thereof across the impedance element engaged by said wiper arm, the magnitudes of said predetermined portions of said applied voltage being determined by the angular position of said wiper arm.

15. A variable impedance device comprising a plurality of series-connected longitudinally extensive impedance elements, each of said impedance elements being curved about a fixed origin in the form of a segment of a logarithmic spiral and wiper means conductively engaging said impedance elements, said wiper means being adapted to rotate about said origin.

16. A functional potentiometer comprising a plurality of longitudinally extensive curved impedance elements disposed about a fixed axis, wiper means adapted for rotation about said fixed axis and for conductive engagement with each of said curved impedance elements, the impedance between the point of contact of said wiper means and a fixed point on the engaged impedance element being an exponential function of the angular displacement of said wiper means, and voltage selector means coupled to said wiper means, said voltage selector means being adapted to receive an applied voltage and selectively couple predetermined portions thereof across said impedance elements, the magnitudes of said predetermined portions of said applied voltage being determined by the angular position of said wiper means.

17. A functional potentiometer comprising an input shaft, a pair of longitudinally extensive curved impedance elements disposed about the axis of said input shaft, a pair of series-connected resistors connected in series with said impedance elements, wiper means coupled to said input shaft for rotation therewith and for conductive engagement with said curved impedance elements, the impedance between the point of contact of said wiper means with the engaged impedance element and the junction of said series-connected resistors being an exponential function of the angular displacement of said wiper means, and voltage selector means mechanically coupled to said input shaft, said voltage selector means being adapted to receive an applied voltage and to selectively couple predetermined portions thereof across said impedance elements, the magnitudes of said predetermined portions of said applied voltage being determined by the angular position of said wiper means.

18. A variable impedance device comprising a plurality of longitudinally extensive curved impedance elements disposed about a fixed axis and coupled in series to form a closed loop, each of said impedance elements having an impedance between any point thereon and one end thereof which is an exponential function of the angular displacement of said point about said axis, and wiper means adapted for rotation about said fixed axis, said wiper means conductively engaging each of said impedance elements in sequence.

19. The variable impedance device as defined by claim 18 further comprising voltage selector means mechanically coupled to said wiper means and electrically coupled to the junctions of said series-coupled impedance elements, said voltage selector means being adapted for receiving an applied voltage and selectively coupling predetermined portions thereof to the junctions of said series-coupled impedance elements.

20. The variable impedance device as defined by claim 19 wherein said plurality of curved impedance elements comprise three impedance elements disposed about a fixed axis and coupled in series to form a closed loop and wherein said voltage selector means includes three selector switches each having a movable contactor mechanically coupled to said wiper means, the movable contactors of said three selector switches being electrically coupled, respectively, to the junctions between said three series-coupled impedance elements.

References Cited in the file of this patent

UNITED STATES PATENTS

| | | |
|---|---|---|
| 1,785,779 | Lauter | Dec. 23, 1930 |
| 1,971,238 | Silling | Aug. 21, 1934 |
| 2,501,813 | Franklin | Mar. 28, 1950 |
| 2,561,140 | Schaffer | July 17, 1951 |
| 2,744,986 | Caldwell | May 8, 1956 |
| 2,774,934 | Gitzendanner | Dec. 18, 1956 |

FOREIGN PATENTS

| | | |
|---|---|---|
| 377,315 | Great Britain | July 28, 1932 |